United States Patent [19]
Vandenhoeck

[11] 3,812,660

[45] May 28, 1974

[54] FILTER APPARATUS

[75] Inventor: J. Paul Vandenhoeck, New York, N.Y.

[73] Assignee: Combustion Equipment Associates, Inc., New York, N.Y.

[22] Filed: Jan. 11, 1973

[21] Appl. No.: 322,832

[52] U.S. Cl.............. 55/378, 55/341, 248/295, 248/327
[51] Int. Cl............................ B01d 46/06
[58] Field of Search............ 55/304, 341, 374–378, 55/502; 248/317, 295, 327, 320

[56] References Cited
UNITED STATES PATENTS

| 833,068 | 10/1906 | Lloyd | 248/327 X |
| 2,308,309 | 1/1943 | Ruemelin et al. | 55/377 |
| 2,308,310 | 1/1943 | Ruemelin et al. | 55/341 UX |
| 2,338,504 | 1/1944 | Foster | 55/378 X |
| 2,576,310 | 11/1951 | Ruemelin | 55/377 |
| 2,805,731 | 9/1957 | Kron | 55/377 X |
| 2,962,253 | 11/1960 | Moore | 248/320 |
| 3,372,534 | 3/1968 | Hysinger et al. | 55/378 X |
| 3,550,358 | 12/1970 | McCabe | 55/378 X |
| 3,724,178 | 4/1973 | LeBoeuf | 55/378 X |
| 3,747,305 | 7/1973 | Odell et al. | 55/378 X |

Primary Examiner—Frank W. Lutter
Assistant Examiner—Vincent Gifford
Attorney, Agent, or Firm—Blum, Moscovitz, Friedman & Kaplan

[57] ABSTRACT

Air carrying particulate matter is directed through rows of filter bags in a bag house. The air is filtered by trapping the particulate matter on the interior walls of the bag, while the filtered air passes through the walls of the bag. The filter bags are adjustably suspended at one end by a spring arrangement which permits the bags to be extended and retracted and fixed at the other end by a collar or ring for installation and servicing.

6 Claims, 8 Drawing Figures

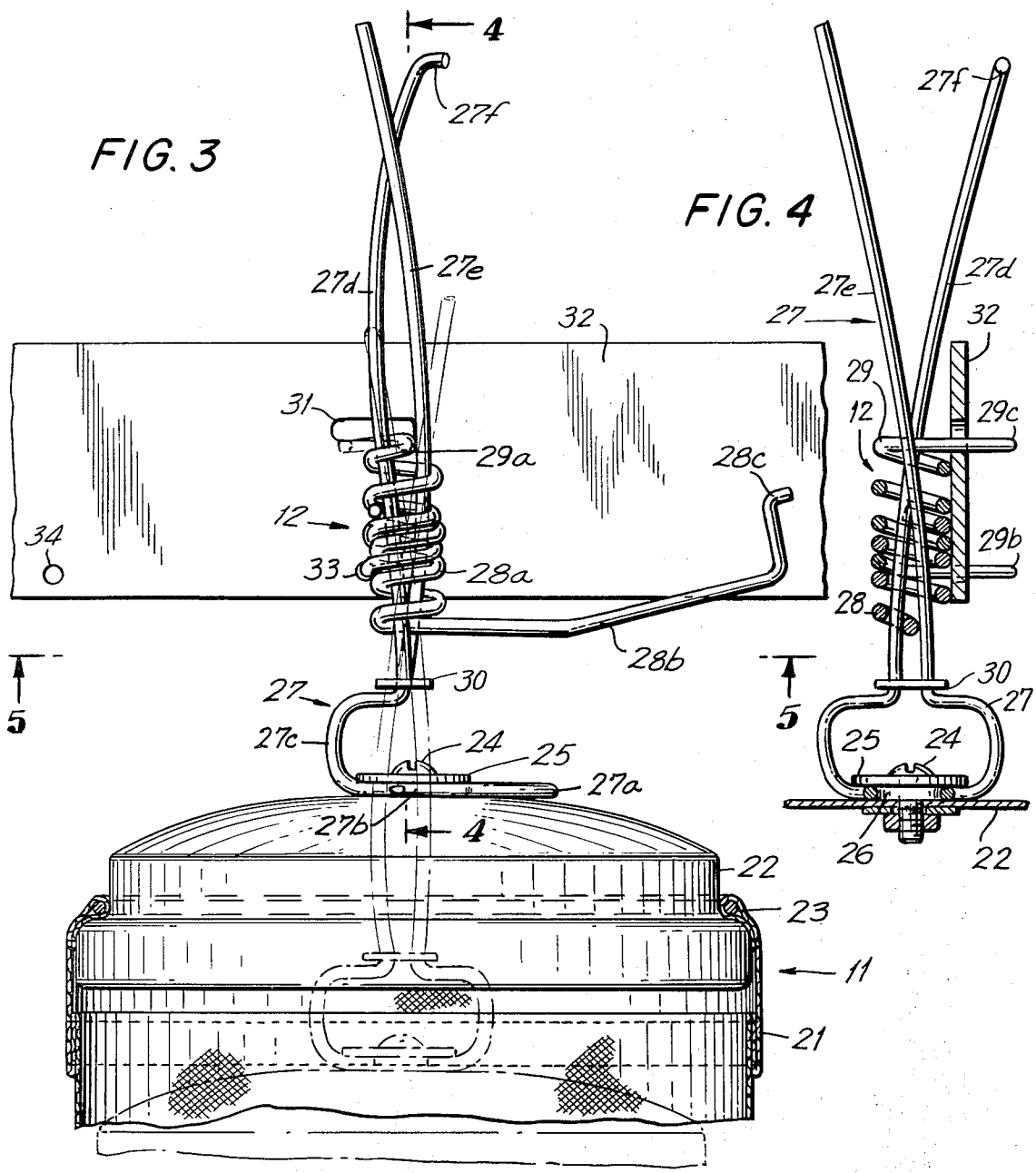

FILTER APPARATUS

BACKGROUND OF THE INVENTION

This invention relates generally to an air filter and especially to air filters in a bag house for removing particulate matter from the air. While bag house air filters of various constructions have been available, they have been difficult to service for purposes of rejuvenation, replacement and installation.

SUMMARY OF THE INVENTION

The air filter in accordance with the present invention, has rows of substantially elongated filter bags suspended within a housing known as a bag house. The air carrying particulate matter is directed into the interior of the filter bags through their bottom openings. The particulate matter is caught or trapped on the interior walls of the bags, while the filtered air passes through the walls of the bags. After passage of the filtered air from the interior of the bags, the filtered air is directed out of the housing and into the atmosphere or for further purification.

The bags are suspended at their tops by a spring arrangement in which a combination of movable and stationary springs cooperate to permit the bags to be flexibly retracted or extended so that they may be readily installed and serviced. The spring arrangement allows the bags to be locked in place in either retracted or extended positions. A silicone ring at the bottom rim of the bag and passing through an opening in a mounting plate, holds the bottom of the bag in fixed position while the air to be filtered is directed into the interior of the bag.

Accordingly, it is an object of the present invention to provide an air filter which may be easily installed and serviced.

Another object of the invention is to provide an air filter in which the filter elements are readily accessible for replacement.

A further object of the invention is to provide an improved air filter substantially protected from wear from high velocity air to be filtered.

Still another object of this invention is to provide an improved air filter which is simple in design and may be economically constructed and maintained.

Still other objects and advantages of the invention will in part be obvious and will in part be apparent from the specifications and drawings.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 3 is an elevational view of the assembled spring combination for suspending the filter bags, and shows the assembly with the bag in extended and retracted positions and the assembly in unlocked condition.

FIG. 4 is a sectional view of the spring assembly taken along line 4—4 in FIG. 3.

FIG. 5 is a sectional view taken along line 5—5 in FIG. 3.

DESCRIPTION OF THE PREFERRED EMBODIMENT

Figure 2:
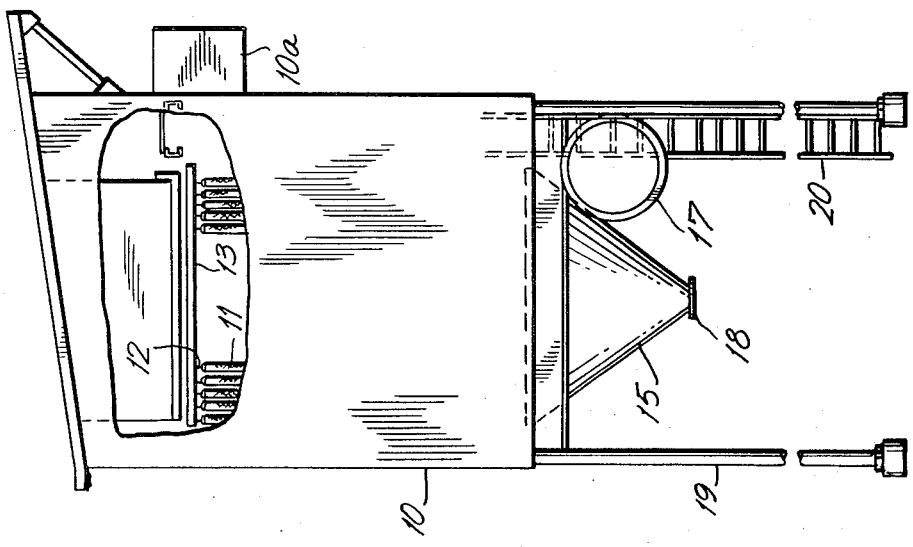
FIG. 2 is an end view with parts broken away, of the arrangement of FIG. 1.
Figure 1:
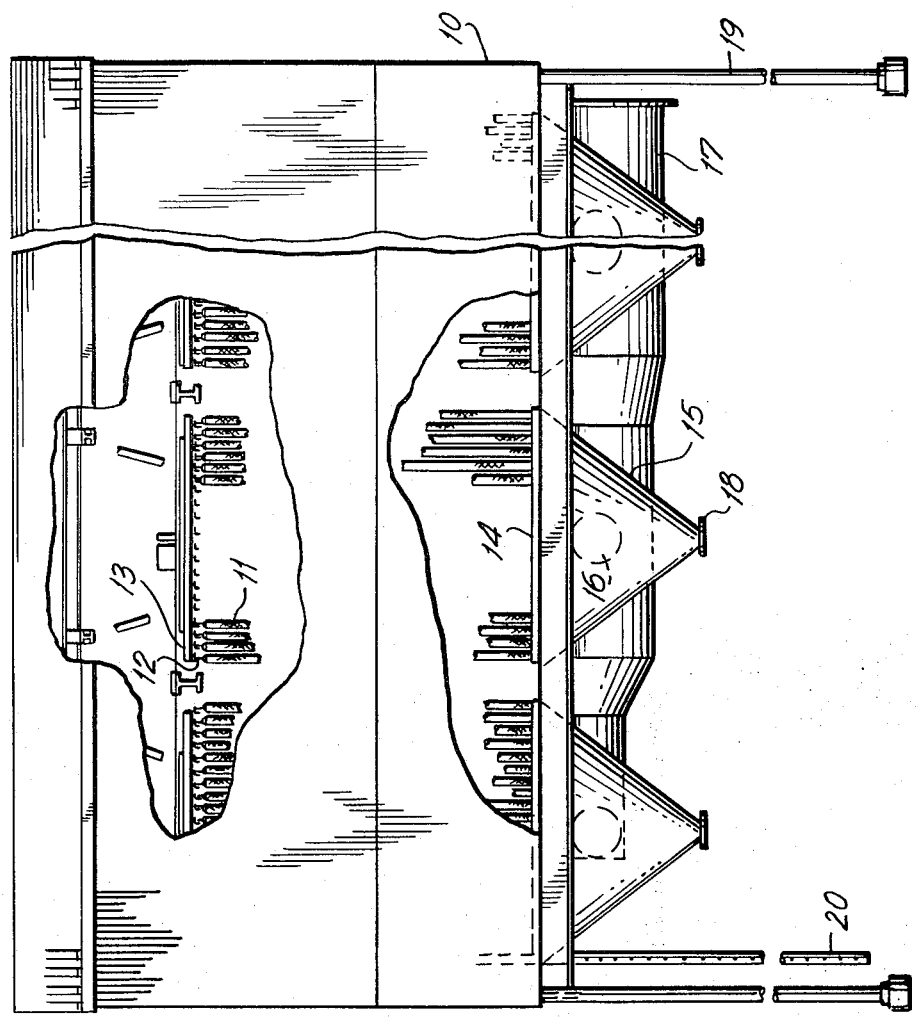
FIG. 1 is an elevational front view with parts broken away and shows filter bags arranged in rows within the interior of the bag house in accordance with a preferred embodiment of the instant invention.
Figure 6:
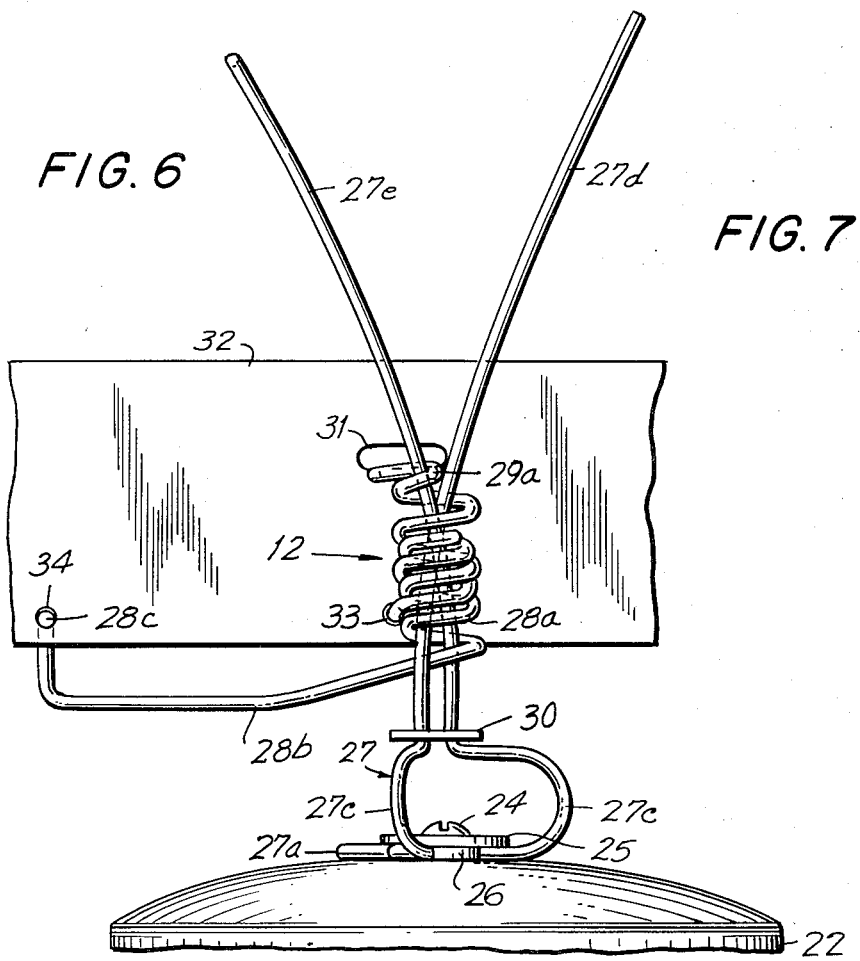
FIG. 6 is an elevational view of the spring assembly for suspending the filter bag, when in locked position.

Referring now to FIGS. 1 and 2, the air filter has a housing or bag house 10 for confining the filter bags 11 arranged in rows within the interior of the housing. The bags 11 are suspended by a spring assembly 12 secured to a bracket mounting 13. The bottoms of the bags pass through openings in a base plate 14. The openings in the plate 14 communicate with hoppers 15. As a result, the interior of the bags 11 also communicate with the hopper 15.

The hoppers 15 are connected to an air inlet duct 17, through the passages 16. The air to be filtered and carrying particulate matter is admitted into the hopper 15 from the air inlet duct 17 and passage 16. After entering the hopper 15, the air with the particulate matter rises into the interiors of the bag 11.

As the particulate matter comes into contact with the interior walls of the bag 11, the particulate matter tends to adhere to the interior walls of the bag, while the remaining air passes through the fabric walls of the bag. After thus passing through the walls of the bags, the air is filtered and enters the interior of the housing 10 from which it is permitted to pass into the atmosphere through the outlet duct 10a.

After the particulate matter has accumulated within the interior of the bag to the extent that the air flow through the bags is reduced to a predetermined amount, the particulate matter may be removed by shaking the bag or applying vibrations, for example, to the walls of the bags. In such a cleansing process, the particulate matter drops downward into the hopper 15 from which it can be removed through the hopper valve 18. This valve is closed during the time in which air is admitted for filtering purposes to prevent the air from escaping through the valve. Accordingly, the valves 18 are opened only during the interval when the bags are cleansed and the particulate matter is to be removed for disposal.

The housing 10 is raised on posts 19, and a ladder 20 is provided to enable maintenance personnel to enter the interior of the housing.

Referring to FIG. 3, the bag 11 has a fabric wall 21 provided with a hem along the top rim to include a circular-shaped wire 23 for fastening the fabric wall 21 to a metal cap 22. The wire 23 within the hem of the fabric wall 21 serves to press tightly the top rim of the fabric wall against the metal cap 22 so as to form an airtight seal. The top of the metal cap has a central opening through which a screw 24 is admitted for fastening a washer 25 and spacer 26 to the top of the cap. The spacer 26 between the top surface of the cap and the lower surface of the washer 25, may be made integral with the washer. The washer 25 and spacer 26 serves to removably anchor a suspension spring 27 to the top of the metal cap 22. The suspension spring 27 is part of the spring assembly indicated generally at 12.

Figure 7:
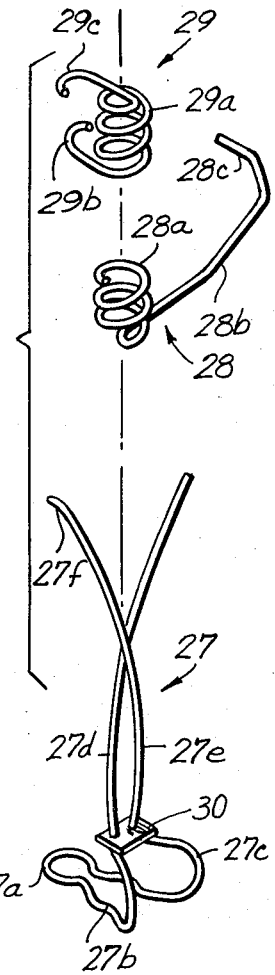
FIG. 7 is an exploded view of the elements comprising the spring assembly shown in FIG. 6.

The suspension spring member shown in detail in FIG. 7, has a loop portion 27a joined to a curved portion 27b. When assembled to the top of the metal cap 22, the curved portion 27b is sandwiched between the lower surface of the washer 25 and the top surface of the metal cap 22. The height of the spacer 26 corresponds substantially to the thickness of the wire in the curved portion 27b. When assembled in place to the top of the metal cap, furthermore, the suspension spring 27 has substantially vertical loops 27c joined to elongated legs 27d and 27e. A plate member 30 is drilled to loosely fit over the leg 27d and 27e for the purpose of retaining the shape of the suspension spring member 27.

Wound about the legs 27d and 27e, is the movable spring element 28. The latter has a coil portion 28a and an elongated arm 28b. Intermeshed with the loops of the coil 28a, are coils 29a of the stationary spring elements 29. The spring element 29 has, furthermore, an upper arm 29c which passes through a slot 31 in a bracket 32. The lower arm 29b of the spring element 29 passes through an opening 33 in the bracket 32. When assembled to the bracket 32, the coiled loops 29a are on one side of the bracket, whereas the end of the arms 29b and 29c are against the opposite sides of the bracket. The bracket 32 serves to suspend the spring assembly 12. This relationship may be seen in FIG. 4.

When the curved portion 27b of the suspension spring 27 holds the top of the metal cap 22, and the movable spring element 28 is loosely wound about the legs 27d and 27e while loosely intermeshing with the loops 29a of the stationary spring element 29, the metal cap 22 may be displaced vertically so that the legs 27d and 27e slide freely along the vertical axis through the coiled loops 28a and 29a. In this state of the spring assembly, in which the suspension spring 27 may slide freely within the coiled loops of the spring elements 28 and 29, the legs 27d and 27e have cross-over point substantially within the interior of the loops 28a and 29a. To lock the suspension spring 27 in place so that it is not free to slide vertically within the loops 28a and 29a, the arm 28b is rotated substantially 180° from the position shown in FIG. 3. This rotation of the arm 28b forces the legs 27d and 27e against the interior surfaces of the coiled loops 28a and 29a. At the same time, the rotation of the arm 28b causes the cross-over point of the legs 27d and 27e to move upward and above the upper arm 29c of the spring assembly. As a result of forcing the legs 27d and 27e against the interior surfaces of the coiled loops 29a and 28a, force is required to rotate the arm 28b so that the latter is tensioned during the rotating motion.

To lock the arm 28b in place while in the tensioned state, the end of the arm is moved underneath the bracket 32 and allowed to then press against the opposite side of the bracket with the end of its arm. Thus, in this tensioned state of the arm 28b, the latter is prevented from returning to its initial untensioned state by the bracket 32. To release the arm 28b so that the latter may return to its initial untensioned state, the arm is moved downward so that the ends of the arm may now freely move past the lower edge of the bracket 32 and thereby rotate back to its initial position.

By locking the arm 28b in place against the bracket 32, the suspension spring element 27 may be held in fixed position at any desired point along its legs 27d and 27e. To secure the arm 28b firmly in place while in the tensioned state, an opening 34 may be further provided in the bracket 32 for the purpose of admitting the bent end 28c of the arm while in the tensioned or locked position.

The upper end of the leg 27e of the suspension spring 27 has an angled portion 27f. This angled portion prevents the suspension spring element 27 from sliding out of the coiled loops 29a when moved to the lowest position. At the same time, the angled portion 27f also serves as a bearing surface against which the other leg 27d presses when the spring assembly is in locked position as a result of rotation of the arm 28b.

Figure 8:
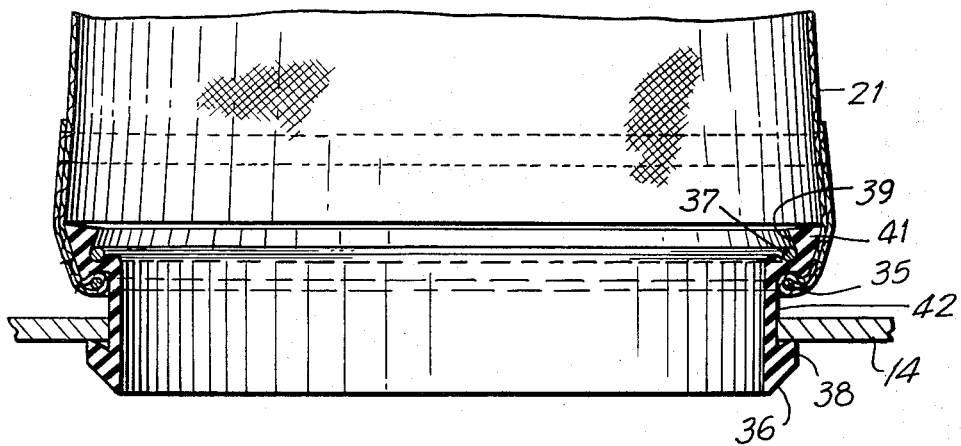
FIG. 8 is a partial sectional view and shows the construction of the bottom portion of the filter bags in combination with the mounting arrangement for locating in place the bottom portion of the bags.

To hold the lower part of the filter bag in place while the air to be filtered is directed upward into the interior of the bag, the fabric 21 has a lower hem for admitting a circular-shape stiffening wire 35. The diameter of the circle is less than the diameter of the bag as best seen in FIG. 8. A ring 36 preferably made of high temperature silicone passes partially into the lower interior of the filter fabric 21 with an external groove 42 firmly pressing against the wire 35. To further seal the silicone ring 36 against the lower rim of the filter fabric 21, the ring 36 is provided with a lip 41 which has a groove 39 to seat a circular-shaped wire or ring 37 whose diameter is substantially that of ring 35. The combination of the stiffening elements 35 and 37 serve to apply an airtight seal between the silicone rings 36 and the lower rim of the fabric 21. The high temperature silicone ring 36 prevents damage to the lower rim or lower end of the filter fabric 21, due to high-velocity air rushing into the interior of the bag from below. The presence of this ring 36, therefore, serves to prolong substantially the operating life of the filter bag, since destruction of the fabric due to erosion by incoming high velocity air is substantially prevented. The ring 36 and thereby, the lower end of the filter bag is firmly anchored in place by passing the ring 36 through a corresponding opening in the base plate 14. The ring 36 has a flanged portion 38 bearing against the lower surface of the mounting plate 14 for the purpose of forming an air-tight seal against the plate. In this manner, the air to be filtered cannot leak or seep past the filter bag.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A filter apparatus for removably and adjustably mounting a cylindrical, flexible filter bag having a closed top and an open bottom in a housing between a bracket and a plate comprising adjustable suspension means interconnecting said bag at the top thereof and said bracket for suspending said bag from said bracket, said suspension means having locked and unlocked positions, said bag being longitudinally movable when said suspension means is in said unlocked position and being substantially unmovable when said suspension means is in said locked position, and ring means interconnecting said bag at the bottom thereof and said plate for positioning said bag above said plate whereby to permit entry of air to be filtered into said bag through said plate and said ring means, wherein said suspension means comprises a first spring member connected to said bag at the top thereof, a second spring member coiled about said first spring member and having an arm movable between said lock and unlocked positions, and a third spring member mounted to said plate and having coils intermeshing with coils of said second spring member.

2. A filter apparatus as claimed in claim 1 wherein said first spring member has two leg portions passing through the interiors of the coils of said second and third spring members.

3. A filter apparatus as claimed in claim 2 wherein said legs of said first spring member are pressed against the interior walls of the coils of said second and third spring members when said arm of said second spring member is in said locked position, said legs being freely slidable within the coils of said second and third spring members when said arm is in said unlocked position.

4. A filter apparatus as claimed in claim 3 wherein said arm of said second spring member is rotated substantially 180° between said locked and unlocked positions, said arm being tensioned when in said locked position, said arm including means for inter-engagement with said bracket for releasably retaining said arm in said locked position.

5. A filter apparatus as claimed in claim 1 wherein said ring is flexible and means includes a circular stiffening element fixed to said bag at the lower end thereof, a deformable ring member having a first external groove for receiving said circular stiffening element, a lip whose diameter is greater than said first groove, a second groove within said lip, a sealing ring within said second groove, and a flanged portion extending longitudinally of said external groove for mounting said deformable ring member through an aperture in said plate.

6. A filter apparatus as claimed in claim 5 wherein said deformable ring member comprises a silicone ring.

* * * * *